United States Patent [19]

Nishino et al.

[11] Patent Number: 4,460,630
[45] Date of Patent: Jul. 17, 1984

[54] METHOD OF FORMING PORCELAIN ENAMELS ON ALUMINIZED STEEL

[75] Inventors: Atsushi Nishino, Neyagawa; Kazunori Sonetaka; Kunio Kimura, both of Hirakata; Yoshihiro Watanabe, Moriguchi, all of Japan

[73] Assignee: Matsushita Electric Industrial Co., Ltd., Kadoma, Japan

[21] Appl. No.: 356,463

[22] Filed: Mar. 9, 1982

Related U.S. Application Data

[63] Continuation of Ser. No. 191,148, Sep. 26, 1980, abandoned, which is a continuation of Ser. No. 14,905, Feb. 23, 1979, abandoned.

[30] Foreign Application Priority Data

Mar. 15, 1978 [JP] Japan .................. 53-30443
Sep. 4, 1978 [JP] Japan .................. 53-108999

[51] Int. Cl.³ ................................ B05D 3/02
[52] U.S. Cl. ........................ 427/376.2; 427/376.4; 427/376.5; 427/380; 427/387; 427/388.1; 427/397.8; 427/405; 427/419.4
[58] Field of Search .......... 427/376.2, 376.3, 388.1, 427/376.4, 380, 419.2, 419.3, 376.5, 435, 379, 383.7, 419.4, 387, 419.6, 405, 397.8, 427; 126/19 R; 428/433

[56] References Cited

U.S. PATENT DOCUMENTS

| | | | |
|---|---|---|---|
| 2,021,819 | 11/1935 | Turk | 427/379 |
| 2,385,573 | 9/1945 | Hommel et al. | 427/379 |
| 2,930,713 | 3/1960 | Hoffman | 428/433 |
| 3,051,589 | 8/1962 | Sanford et al. | 428/433 |
| 3,061,449 | 10/1962 | Hoffman | 427/376.4 |
| 3,062,685 | 11/1962 | Sanford et al. | 428/433 |
| 3,266,477 | 8/1966 | Stiles | 126/19 R |
| 3,338,732 | 8/1967 | Holcomb | 427/376.4 |
| 3,361,588 | 1/1968 | Scharbach et al. | 428/433 |
| 3,460,523 | 8/1969 | Stiles et al. | 126/19 R |
| 3,523,817 | 8/1970 | Reiss | 427/376.4 |
| 3,547,098 | 12/1970 | Lee | 126/19 R |
| 3,564,585 | 2/1971 | Camp | 428/653 |
| 3,587,556 | 6/1971 | Moreland | 126/19 R |
| 3,627,560 | 12/1971 | Morgan | 427/376.3 |
| 3,717,513 | 2/1973 | Adenis | 428/653 |
| 3,836,380 | 9/1974 | Kramer | 427/419.4 |
| 4,074,010 | 2/1978 | Knight | 427/376.5 |
| 4,110,487 | 8/1978 | Rion | 427/376.5 |

FOREIGN PATENT DOCUMENTS

| | | | |
|---|---|---|---|
| 1582316 | 9/1969 | France | 427/376.4 |
| 44-25715 | 10/1969 | Japan | 427/376.4 |

OTHER PUBLICATIONS

Yamada et al., Metal Surface Technology, vol. 14, No. 10, 1963.

Primary Examiner—Sadie L. Childs
Attorney, Agent, or Firm—Cushman, Darby & Cushman

[57] ABSTRACT

In a method of forming porcelain enamel layer on a metal substrate, the method comprises steps of applying a first coating for an underlying ground layer and a second coating for overlying self-cleaning layer or coloring layer, and the method is characterized by firing both of said first coating and said second coating at the same time, forming a double layered porcelain enamel layer having an inter-layer wherein both layers are mixed, thus giving a sufficient bonding force inbetween as well as strong corrosion resistivity of the substrate due to few pinholes and bubbles in the underlying ground coating.

22 Claims, 3 Drawing Figures

METHOD OF FORMING PORCELAIN ENAMELS ON ALUMINIZED STEEL

This is a continuation of application Ser. No. 191,148 filed Sept. 26, 1980; which is a continuation of Ser. No. 14,905 filed Feb. 23, 1979, both now abandoned.

BACKGROUND OF THE INVENTION

1. Field of the Invention

The present invention relates to the art of forming porcelain enamels on a metal substrate. Particularly, the invention concerns the art of forming double layers of porcelain enamels on a metal substrate.

2. Description of the Prior Art

Porcelain enamels are very useful and widely used in cooking apparatus, for example, ovens. Especially, a double layered porcelain enamel coating is useful for the following reasons:

First, recently it becomes popular to use self-cleaning porcelain enamel layers for cooking apparatus such as an oven. Such a self-cleaning porcelain enamel layer generally comprises an underlying supporting enamel layer and an overlying catalyst containing layer.

Second, if formation of a thick double layered porcelain enamel layer on a metal substrate with a single firing process is possible, such a procelain enamel layer can be formed on a thin aluminized steel sheet, thereby enabling one to make various cooking apparatus by using the porcelain-enameled aluminized steel sheet.

The self-cleaning porcelain-enamel overlying layers containing an oxidizing catalyst composition have become widely used in recent years. Concerning the compositions of the layer per se, many layer compositions, for example U.S. Pat. No. 3,266,477, for Stiles and other, have been already proposed. In such a self-cleaning catalyst layer, for a high efficiency of the self-cleaning property, it is important to make the catalyst layer porous, because such a porous catalyst layer holds a large amount of grease spatters and other products resulting from cooking, efficiently oxides them by catalitic reaction on a wide area and supplies a sufficient amount of air onto the reacting surface thereof. For the purpose of obtaining such a porous surface of the catalytic layer, it is effective to use a frit, as disclosed in U.S. Pat. No. 3,587,556 for Moreland, U.S. Pat. No. 3,547,098 for Lee, and others. Such self-cleaning layer, which contains a frit as a binder, must be formed on an underlying corrosion-resisting porcelain layer, in order to protect the metal substrate from corrosion. The corrosion resisting layer provided under the self-cleaning layer functions to protect the metal substrate from suffering corrosion due to the fact that the self-cleaning layer is porous to allow oxygen or other corrosive substances to reach the substrate metal surface and the self-cleaning layer contains oxidizing catalyst. If such a corrosion resisting layer is not provided under the self-cleaning layer, the substrate metal will be fatally corroded within only a few hours, coupled with the effect of salt contained in the product resultant from the cooking and attached on the self-cleaning layer.

For the abovementioned reason, the underlying corrosion resisting porcelain enamel layer is essential and hence is already known. However, the conventional way to form the double layers consisting of the underlying corrosion resisting porcelain layer and the overlying self-cleaning layer comprises two coating steps for the underlying porcelain layer and the overlying self-cleaning layer, followed by respective separate firings for the two layers. These double-coating-twice firing methods have the drawbacks of high manufacturing costs due to long manufacturing times and a high fuel consumption due to double firings as well as susceptibility to distortion of the apparatus body on which the double layer is formed. Secondly, when an aluminized steel sheet is employed for the metal substrate, the rear face of the aluminized steel sheet is likely to lose its gloss and resistivity to corrosion. Thirdly, as the most important item, the double layer formed by means of the conventional twice-coatings-twice-firings method has a poor adhesion force between its underlying layer (ground layer) and the overlying layer. This is because the underlying first layer for corrosion prevention is made by firing at such a high temperature to sufficiently form a pore-free layer, while the overlying self-cleaning layer is fired at as low temperature as possible in order to obtain sufficient porosity, thus making it difficult to form an interface of the co-melting layer of and between the underlying layer and the overlying layer. Namely, due to the high temperature firing, the surface of the underlying layer becomes considerably smooth and fine, and therefore, a firing of the overlying self-cleaning layer at the lower temperature hardly causes the surface of the underlying layer to melt, hence fails to form the interface layer which gives a strong bonding force. Therefore, in accordance with the conventional method of forming a double layered porcelain enamel layer, it is difficult to obtain a sufficient adhesion force between the first and the second layers, and therefore the second layer for the self-cleaning is liable to peal off by shocks or lapse of time.

SUMMARY OF THE INVENTION

The present invention provides a novel and improved method of forming a strong porcelain enamel layer on a metal substrate.

The present invention especially provides an improved method of forming a strong double layered porcelain enamel layer on metal substrate in an economical way.

PREFERRED EMBODIMENT

The method in accordance with the present invention is featured by forming two successive coatings of layers of different slips, followed by a single firing of both layers. In order to realize the twice coatings and a single firing method, a first, i.e., underlying coating of slip formed on the metal substrate is dried at a temperature lower than the softening point of glass frit contained in the slip, and after forming a second coating of slip thereon, both layers are fired simultaneously.

When a self-cleaning porcelain enamel layer has an overlying second layer on the underlying ground coating is formed in accordance with the present invention, the bonding force of the self-cleaning layer is greatly improved.

When the porcelain enamel layer of a double layered enamel layer is formed on an aluminized steel sheet, in accordance with the present invention, the use of a single firing step is advantageous for decreasing adverse pinholes and bubbles, thereby increasing resistivity against corrosion.

Preferred embodiments of the present invention are elucidated hereinafter.

A first embodiment of the invention is now described as follows.

Figure 2:
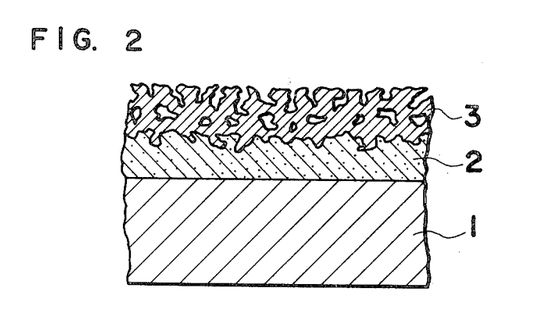
FIG. 2 is a schematic sectional view of a double layered porcelain enamel layer on a metal substrate formed in accordance with an example of the present invention.

This embodiment concerns a method of forming a double layered porcelain enamel layer comprising an underlying ground coat enamel layer and an overlying catalyst layer as generally shown in FIG. 2.

A slip for forming the ground layer (an underlying layer) contains at least a frit. The term "slip" is generally used in porcelain enamel engineering field to mean slurry comprising a frit, a matting agent, a mill addition, and water. A coating of the slip is formed by spraying the slip on a metal substrate or by dipping the metal substrate in a bath of the slip. After drying, the coating of the slip is fired to form a porcelain enamel layer on the metal substrate. In the present invention, the slip to be used to form the ground coat enamel layer (a first layer) comprises a frit as a binder. The frit to be contained in the slip for the ground coat enamel layer should have a softening point which is lower than that of the frit to be used in the overlying layer (a second layer). The reason for this selection is that, when both the first and the second layers are fired at a same time, the first layer become appropriately softened so as to form a pore-free corrosion resisting layer, and furthermore, the interface portion between the first layer and the second layer forms a mixture of both layers, thereby assuring a strong bonding force inbetween. If the softening point of the frit of the slip for the first layer is considerably higher than that of the frit of the slip for the second layer, it is impossible to obtain a corrosion resisting porcelain enamel layer. But, when the softening point of the first frit is only slightly higher than that of the second frit, then such a corrosion resisting enamel can be formed. This is because, in order to form a smooth and fine porcelain enamel layer, the first slip contains less amount of mill additive and matting additive per unit amount of the frit in the comparison as compared with the second slip. Thus, by reducing the amount of the additives per the amount of the frit, the softening point is lowered to some extent.

On the contrary, the slip used to form the composition of the second layer contains a higher ratio of amount of additives, such as oxidizing catalyst, matting additive, etc., to that of frit, and accordingly, the softening point of the second layer is higher than that of the first layer. Thus by firing the first layer and the second layer at the same time, the second layer is made to have a specified porosity. This property is utilized to form the porous self-cleaning layer on a smooth and fine ground or base layer. As described above, the softening temperature of the frit of first slip is preferably lower than that of the frit of the second slip. But the softening temperature of the frit per se of the second slip can be a little higher than that of the frit per se of the first slip, by the extent of less than 50° C. of the temperature difference, for forming a strong and fine ground or base coat enamel layer (i.e., the first layer).

The frit for use in preparing the slip for the self-cleaning layer (the second layer of this embodiment) can be such a frit that is prepared by dissolving the oxidizing catalyst therein or by mixing with the frit during the milling process thereof. The oxidizing catalyst can be at least a member selected from the group consisting of oxides of Mn, Cu, Co, Ni, Cr and Fe, or mixed oxides of these metals. Besides, a solid acid catalyst selected from the group consisting of zeolite, Japanese acid clay, activated clay or its derivative, silica-alumina compounds and silica-magnesia compounds can be used as the oxidizing catalyst. Such oxidizing catalyst can be dissolved in the frit or added to the frit during a milling process. In both cases, at least one matting agent selected from the group consisting of $Al_2O_3$, $SiO_2$, $ZnO_2$, $TiO_2$ or at least one refractory inorganic material containing at least one member thereof can be added. Besides, if desired, a mill additive such as clay, sodium nitrite, urea, bentonite, ammonium carbonate, magnesium carbonate, sodium silicate, and the like may be included.

Next, the method of forming the double layered porcelain enamel in accordance with the present invention is elucidated.

First, for the metal substrate, any metal substrates to which a porcelain enamel can be applicable can be used. Representative of the metal substrate is mild steel sheet for enamel and aluminized steel sheet. The metal substrate is subjected to a known pretreatment. Namely, the mild steel sheet is subjected to degreasing, washing and dipping in a $NiSO_4$ solution bath before use. The aluminized steel sheet is subject to degreasing and washing before use.

The first slip for forming a first coating of the slip is prepared by ball-milling the ingredients and controlling the grain size. The application of the coating of the slip is made by spraying or dipping. In general, for the mild steel sheet, the dipping is made in order to form a porcelain enamel layer on both faces. On the other hand, for the aluminized steel sheet, it is generally preferable to use the spray method, so that the rear face is left as a glossy aluminized face. The coating of the slip is then preferably dried at a low temperature. In the conventional method of forming a double layered porcelain enamel layer, a firing was made after the drying, but in the present method, the firing is postponed till after a forming of a second coating on the abovementioned first coating. Forming of the second layer should be made after the drying in order to obtain good setting of the slips on the metal substrate. The drying temperature must not exceed 350° C. If the drying is conducted at a temperature over 350° C., the slip of the first coating becomes melted and the surface thereof becomes smooth, thereby making the bonding force weak between the overlying second layer to the first layer. The drying should be made in such a manner that moisture content rate of the first layer becomes 80% or lower. The moisture content rate is defined by:

$$\frac{\text{amount of residue moisture}}{\text{initial amount of moisture in coating}} \times 100 \ldots (\%),$$

and represents the rate of the residue moisture in the slip after drying. The figure of 80% of the moisture content rate corresponds to the state in which water is removed from the surface of the slip coating. When the coating is in a such state, the second coating can be firmly set on the first coating. For attaining a better result, the first coating of slip is preferably dried by heating for a certain time period under 350° C. In order to obtain a strong force for the dried coating of the first slip, the present invention is characterized by adding a binder, which makes the slip set at a temperature under 350° C., into the slip of the first coating.

The binder consists mainly of a slip containing at least one member selected from the group consisting of alkali silicate, colloidal silica, colloidal alumina, silicone resins and organic binder. The binder remains in the slip after the drying, and to give the slip coating a suitable bonding force, thereby enabling bonding of the slip coating on the substrate.

The alkali silicate is generally called a water glass, and typical of it is sodium silicate or potassium silicate.

The colloidal silica and the colloidal alumina are also called silica sol and alumina sol, respectively, and are dispersions comprising 1 to 100 μm colliods of silica or alumina stably in a liquid dispersion medium. The present invention utilizes the binder effect of these sols.

The silicone resins have a three dimensional network structure and are organopolysiloxane, the main component thereof being dimethylpolysiloxane. There are many varieties of the silicone resin, depending on mol ratio between organic group and silicon (R/Si), and the word silicone resin comprehensively denotes these varieties.

For the organic binder, any binder, which is soluble in the water and gives a binding force when dried, can be used, and preferable examples are CMC (carboxymethylcellulose) and PVA (polyvinylalcohol).

The abovementioned binder is added in the mill addition and is milled and mixed with the glass frit in a ball mill or dispersion mill. As stabilizer, one or more of such mill additives as sodium nitrite, clay, urea, magnesium chrolide, gum arabic, etc., are added to the slip when required. Also, titanium oxide, alumina, zirconia, metal oxide for coloring, etc., are added when required.

The slip for the first layer prepared with the abovementioned components and process is then applied on the metal substrate and dried at a temperature not exceeding 350° C. to form the first coating.

Next, a second slip comprising a frit and an oxidizing catalyst for the second layer is applied on the dried first coating. The application of the second slip is ordinarily made by spraying. The second slip coating is also dried, and then both the first and the second coatings are fired at the same time.

For the metal substrate of the mild steel sheet for enamel, the firing is made at a temperature between 780° C. and 820° C. for 3 to 5 minutes. For the metal substrate of the aluminized steel sheet, the firing is made at a temperature between 520° C. and 600° C. for 3 to 5 minutes.

Figure 1:
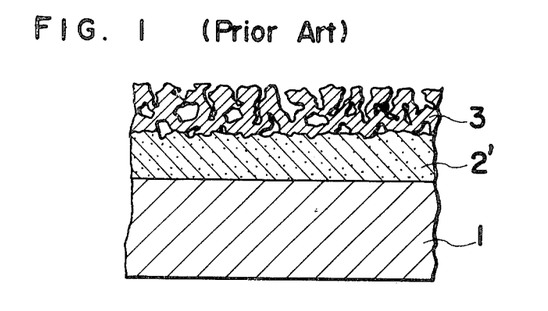
FIG. 1 is a schematic sectional view of a double layered porcelain enamel on a metal substrate formed in accordance with the conventional twice firings method.

The abovementioned method of forming a double layered porcelain enamel not only omits the number of firing steps, but also produces an improved interface between the first and the second layers. The difference is shown by comparison of FIG. 1 showing a schematic microscopic sectional view of the prior art and FIG. 2 showing that of the first embodiment in accordance with the present invention. In the figures, numeral 1 designates the metal substrate, numerals 2 and 2' the first layer (i.e., ground coating) and numeral 3 the overlying second layer, respectively. As shown in FIG. 2, at the interface between the layers 2 and 3 of the embodiment of the present invention is not smooth, but is irregular, thereby providing a strong bonding force between the two layers 2 and 3; while the interface between the ground layer 2' and the overlying second layer 3 formed by the conventional way is smooth as shown in FIG. 1, failing to give sufficient bonding force inbetween. The difference can be clearly observed by experiments forming the first layers and the second layers with colors different from each other. The observation of the intersection shows that the embodiment in accordance with the present invention has a clear inter-layer of color of mixture of the first and the second layers. This inter-layer serves to strongly hold the second layer 3.

A second embodiment of the invention is now described as follows:

The present invention is applicable not only to the case that the overlying second layer is the catalyst containing the self-cleaning layer, but also to a case of forming a high quality porcelain enamel layer on an aluminized steel sheet. By utilizing the method of the present invention, the porcelain enamel layer formed on the aluminized steel sheet is made thick and smooth without gas pores which hitherto have been difficult to remove.

History of the art of forming a porcelain enamel layer on an aluminized steel sheet is not so long. The art begins to be studied only around 1963. Porcelain enamel coating of the aluminized steel sheet has such advantages as:

(1) By using a frit for aluminum, which frit has a relatively low firing temperature, deformation of the steel sheet structure, for example, the frame or box of a home appliance, is minimized.

(2) By utilizing spray coating of slip only on one face of the aluminized steel sheet, it is possible to form porcelain enamel layer only on a single face of a steel substrate, leaving the other face without an enamel coating, thereby leaving it as a glossy aluminized face.

(3) Because of the low firing temperature, the enamel coating can be made on a thin steel sheet.

(4) By application of double porcelain layers, the corrosion of the metal substrate is effectively prevented.

(5) By application of double layered porcelain layers, the surface of the enameled sheet can be made attractive.

Though the porcelain enamel coating on the aluminized steel sheet has the abovementioned advantages, there are such problems to hinder the utilization of the art as trapping of flux, oxides of iron in or under the aluminum layer and pinholes on the aluminum layer. These trappings are liable to defects such as big bubbles or pinholes of the porcelain layer. In order to solve the abovementioned problems, there have been several proposals, for example, preliminarily annealing the aluminized steel sheet at about 500° C. to 600° C. for a specified time period so as to minimize the pin-holes and gas bubbles. However, such pre-annealing does not give satisfactory results.

The present invention can give satisfactory results in removing pinholes and big bubbles from the porcelain enamel layer formed on the aluminized steel sheet.

The reason why the defects of the pinholes and big bubbles are removed by embodying the present invention, is as follows: The dip-aluminized steel sheet is made by dipping a thin steel sheet in a melting Al-Si bath containing 8–10% Si, by running therethrough at a high speed. Therefore the plated aluminum layer has a considerable micrographic pores, which trap air and cause pinholes and bubbles in the porcelain layer formed thereon. The adverse effect of such pinholes and bubbles increases as the number of firing steps becomes larger. Therefore, in order to minimize such defects by the pinholes and bubbles, it is ideal that the firing is made only once. By reducing the number of firings to only one and by forming double layered thick slip coatings, though the small bubbles and small pinholes may exist in the undermost part of the porcelain enamel layer, they do not increase in size to make big pin-holes and bubbles on the surface of the porcelain enamel layer. Namely, by firing only once for double layered thick coatings of the first and the second slips, the fine bubbles and fine pin-holes are suppressed and retained at the undermost part of the resultant thick porcelain enamel layers. Furthermore, some of the pinholes and bubbles are sealed off by the melting porcelain enamel therearound. Accordingly, a smooth face without noticeable pin-holes and bubbles on the surface or the surface part can be formed by utilizing the present invention, and therefore, the appearance, as well as corrosion resistivity of the resultant enameled sheet is satisfactory. In general, the thicker the porcelain enamel layer is, the more advantageous it is with respect to corrosion resistivity. But in the conventional art, it was difficult to form a porcelain enamel layer more than 200 μm in thickness; specially at the corner part of the press work structure the porcelain enamel layer formed by the conventional art was likely to make cracks or to peal off. In this respect, the method of the present invention is advantageous in obtaining a thick porcelain enamel layer since two layers are successively formed. Furthermore, the first layer contains the binder so as to firmly bind on the aluminum surface of the aluminized steel sheet, and therefore, the cracks and the peeling off hardly take pace. At firing, decomposed substances from the binder pass through the second layer, but these substances are decomposed at temperatures of about 350° C., and substantially pass through the second slip coating at the time when the frit of the second coating becomes softened. Accordingly, the melted second layer flows in the pinholes produced by passing gas, and forms a smooth surface of the second layer of the porcelain enamel. Even if some air bubbles discharged from the surface of the aluminized steel sheet pass through the melting porcelain layer, the sufficiently thick porcelain enamel layer easily fills up holes made by gas passing. Of course, due to the method of single firing for both of the first and the second layer together, the bonding force between the two layers is sufficient, contrasted with the conventional method of forming a double layered porcelain enamel of twice coating of slip and subsequent twice firing thereafter.

The second layer of the double layered porcelain enamel layer formed on the aluminized steel sheet is of colored porcelain enamel or self-cleaning porcelain enamel. The second layer comprises metal oxides for coloring or a catalyst other than frit and mill additives, and therefore, due to such metal oxide or catalyst the bonding force to the first layer is likely to be weak. But, according to the present invention, by the abovementioned single firing for two layers of slip coatings, and hence formation of the interlayer between the two layers, a sufficient bonding force is provided.

According to the present invention, by utilizing the underlying first layer as the ground color layer for the overlying second layer, a desirable delicate or clear color can be realized by a single firing. When the overlying second porcelain enamel layer contains a metal oxide for coloring, the oxide works as an oxidizing catalyst to the substrate to some extent in case pinholes are there. However, even in such case, the underlying first pocelain enamel layer functions to prevent the corrosion of the metal substrate. Incidentally, when the second porcelain enamel layer contains a self-cleaning catalyst, the corrosion resistivity of the underlying first layer is far more important than the abovementioned case with a colored porcelain enamel second layer.

A modified embodiment of the second embodiment will be elucidated in the following. An aluminized steel sheet comprising a (Al, Fe, Si)M layer at the interface between a steel substrate and an aluminum plating layer can also be employed as a metal substrate. As described above, the feature of the second embodiment in accordance with the present invention is that a double layered enamel layer is satisfactorily obtainable on an aluminized steel sheet, which steel accompanies the abovementioned problems with pinholes and bubbles. This feature becomes much more distinctive, when a metal substrate is processed by a low temperature annealing for alloying. Low temperature annealing for alloying is an annealing process where the aluminized steel is heated at a temperature between 450° C. and 500° C. for a specified time period. By such low temperature annealing process there appears a portion having a crystal structure of (Al, Fe, Si)M at the interface between a steel plate and the aluminized layer. The (Al, Fe, Si)M layer is of a ternary intermetallic compound, not limited to a specific component. It is a non-stoichiometric compound having a solid solution state.

By forming the (Al, Fe, Si)M layer, the aluminized steel is turned to be more heat resistant. Since the aluminized steel is heated at a temperature of 450°-500° C. to form the (Al, Fe, Si)M layer, the air inside the aluminized layer is discharged. This is advantageous in forming porcelain enamel on the aluminized steel with a (Al, Fe, Si)M layer, owing to the fact that anneled aluminized steel sheet has fewer problems of pinholes and bubbles than non-annealed aluminized steel. By employing such annealed aluminized steel plate as a metal substrate for a porcelain enamel formation of the second embodiment in accordance with the present invention, the rear surface which is not covered with the porcelain enamel layer shows almost no coloration (to grayish black) upon firing of the porcelain enamel layer. Besides, the rear surface is also superior in corrosion resistance.

In the abovementioned description of the present invention, the second layer was the self-cleaning porcelain enamel layers in the first embodiment and the color porcelain enamel layers in the second embodiment.

Figure 3:
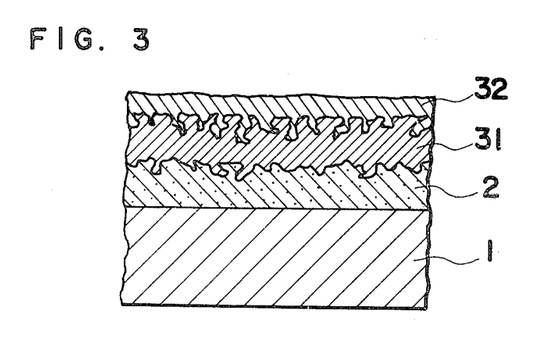
FIG. 3 is a schematic sectional view of a triple layered porcelain enamel layer on a metal substrate formed in accordance with an example of the present invention.

The second layer can be formed for purposes other than the objects in the first and second embodiments. In addition, it is also possible to form further layers on the second layer. FIG. 3 is a schematic enlarged sectional view showing a glazing layer 32 formed as a third layer on a second layer 31. In this case, a binder which is effective below 350° C. is also used for the second layer 31 as well as the first layer 2. The slip for the second layer 31 is sprayed onto the first layer and dried, then slip for the third layer 32 is sprayed and firing is made. Multi-layered structure comprising more than three layers of porcelain enamel layers can be formed in a similar manner.

As described so far, it is possible to form the double or further multiple layer structure by the simple process according to the second embodiment. The process is free from the adverse problems in the employment of the aluminized steel plate as the metal substrate.

The present invention will now be described further in detail by way of the following examples.

EXAMPLE 1 (for the first embodiment)

An aluminized steel plate is used as a metal substrate. A specimen of the metal substrate was 10 cm×20 cm in size and 0.6 mm thick. The specimen is washed and degreased. The frit ingredients as shown in the below-mentioned Table 1 are mixed and fired at 1250° C. for 1 hour.

TABLE 1

| Ingredients | Wt. percent |
| --- | --- |
| $SiO_2$ | 47 |
| $B_2O_3$ | 20 |
| $Na_2O$ | 16 |
| $Al_2O_3$ | 8 |
| $Li_2O$ | 4 |
| $K_2O$ | 3 |
| $CaO$ | 2 |

Then after quenching by water, the fired substance is ground in a ball mill to make a frit for the first layer. The softening temperature of this frit turns out to be 530° C. The components of the resultant frit is substantially equal to those of Table 1.

A slip for the first layer is prepared by making use of the following ingredients added to the frit listed in Table 2.

TABLE 2

| Ingredients | Parts by Wt. |
| --- | --- |
| Frit in accordance with Table 1 | 100 |
| $TiO_2$ | 10 |
| $Al_2O_3$ | 5 |
| $Na_2O.2SiO_2(Na_2Si_2O_5)$ (sodium silicate) ($SiO_2:Na_2O:H_2O = 36:18:46$ Wt. percent) | 12 |
| Water | 45 |

These ingredients in Table 2 are mixed and crushed in a ball mill and filtered by a sieve of 100 mesh to form a slip. The slip is sprayed by a spray gun onto the specimen piece of the aluminized steel plate to form a slip layer of about 100 μm thickness. The first layer is then dried at 60° C. for 30 minutes.

Materials shown in Table 3 are used as frit ingredients for the slip of the second layer. The material component corresponds to the final components in the finished frit.

TABLE 3

| Ingredients | Wt. percent |
| --- | --- |
| $SiO_2$ | 45 |
| $B_2O_3$ | 18 |
| $Na_2O$ | 15 |
| $Al_2O_3$ | 10 |
| $Li_2O$ | 3 |
| $K_2O$ | 3 |
| $CaO$ | 3 |
| $ZnO$ | 3 |

A slip for the second layer is prepared by the following ingredients listed in Table 4.

The abovementioned ingredients are processed in the same manner with those of Table 1, thereby to form the second frit.

TABLE 4

| Ingredients | Parts by Wt. |
| --- | --- |
| Frit in accordance with Table 3 | 100 |
| $\gamma$-$MnO_2$ | 20 |
| Ferrite ($MnFe_2O_4$ + $ZnFe_2O_4$) | 10 |
| $Al_2O_3$ | 30 |
| Aluminosilicate | 5 |
| $Na_2O.2SiO_2(Na_2Si_2O_5)$ (sodium silicate) ($SiO_2:Na_2O:H_2O = 36:18:46$ Wt. percent) | 10 |
| Water | 70 |

The frit in accordance with Table 3 has the softening temperature of 537° C. The slip of Table 4 is sprayed onto the first layer, which is prepared by the slip of Table 2.

The second slip layer is dried at 65° C. for 30 minutes. Then the specimen piece with the first and second layers is fired at 550° C. for 5 minutes. The specimen is tested by the following several test methods.

(1) Peeling Test (Test No. 1)

The specimen is folded with its porcelain enamel layers out around a column or a shaft of 10 mmφ until both end parts of the specimen make a bend angle of 180°. (The bend angle is defined as the angle formed by the straight line parts on both ends of a specimen by deviating from 180°, when the inside surface of the specimen is exposed to the bending momentum.) The test specimen is observed whether it has flaked portions on the outside face of the bent part. The test result is evaluated based on the result that both the first and second layers are adhering to the substrate metal (aluminized steel plate in this example). The test result for the peeling test is judged as "pass" when both the first and second layers remain adhering on the metal substrate and as "fail to pass" when at least the second layer drops off.

Throughout the present invention, the test evaluation is made by classifying the test results into two groups, wherein a first group consists of the ones designated as "P" which pass the abovementioned test evaluation. A second group consists of the ones designated as "F" which fail to pass the test evaluation.

(2) Adherence Test (Test No. 2)

A steel ball (36.51 mmφ and 198.2 g) (of a ball bearing) is used. The steel ball is dropped from a height of 1 meter onto the test specimen and the surface condition of the test specimen is inspected. The evaluation for this adherence test is whether an indentation is formed on the porcelain enamel surface only at the drop point. The test specimen is rejected as "F" when the second layer peels off at least on the second layer around the drop point. When the second layer remains adhering on the substrate, the judgement is indicated as "P" which means "pass".

(3) Corrosion Resistance Test (Test No. 3)

In the method of salt spray testing (a saturated salt solution of 5% salt concentration is atomized at 35° C.), the test specimen is continuously exposed to the salt spray for 10 days. After the salt spray test, the test specimen is subject to visual inspection. The test evaluation for this corrosion resistance test is whether the test specimen has a corroded portion on the surface thereof after the salt spray testing. The test specimen is evaluated as "F" (fail to pass) when it has corroded portions on the surface thereof, and as "P" (pass) when no corroded portion is found.

The test specimens prepared in Example 1 show satisfactory results wherein all specimens are designated as "P" in the Peeling Test (Test No. 1), Adherence Test (Test No. 2) and Corrosion Resistance Test (Test No. 3).

For comparison, some test specimens are prepared in accordance with the conventional procedures, wherein a first layer is sprayed, dried and then fired at 560° C. for 5 minutes and a second layer is formed onto the first layer followed by the second firing process. Such test specimens do not pass the Peeling Test (Test No. 1) and Adherence Test (Test No. 2). They pass and are classified into the group "P" only in the Corrosion Resistance Test (Test No. 3).

EXAMPLE 2 (for the first embodiment)

Ingredients listed in the belowmentioned Table 5 are employed for a frit of a slip for a first layer.

TABLE 5

| Ingredients | Wt. percent |
| --- | --- |
| $SiO_2$ | 49 |
| $B_2O_3$ | 20 |
| $Na_2O$ | 16 |
| $Al_2O_3$ | 8 |
| $Li_2O$ | 2 |
| $K_2O$ | 3 |
| CaO | 2 |

The abovementioned ingredients are processed in a similar manner as of the preparation of the first frit in Example 1.

The frit according to Table 5 has a softening temperature of 545° C. The slip for the first layer, a frit of a slip for a second layer and the slip for the second layer are prepared in the same manner as Example 1. Test specimens are provided under the same preparation conditions as Example 1. The test specimens in this example are tested and it turned out to be satisfactory (grouped in "P") in the Peeling Test (Test No. 1), Adherence Test (Test No. 2) and Corrosion Resistance Test (Test No. 3).

EXAMPLE 3 (for the first embodiment)

A mild steel plate for porcelain enamel of 0.8 mm in thickness is employed as a substrate metal. It is degreased, washed and dipped in a $NiSO_4$ solution bath. A slip for a first layer consists of the following ingredients listed in Table 6.

TABLE 6

| Ingredients | parts by Wt. |
| --- | --- |
| Frit No. 2244 of Nihon Ferro Co. (Japan) (softening temperature: 780° C.) | 20 |
| Frit No. 2254 of Nihon Ferro Co. (Japan) (softening temperature: 800° C.) | 80 |
| $SiO_2$ | 10 |
| $Al_2O_3$ | 20 |
| Clay | 7 |
| Borax (sodium borate: $Na_2B_4O_7.10H_2O$) | 0.1 |
| Bentonite | 0.1 |
| Water | 60 |

The steel plate is dipped into the slip bringing both surfaces thereof onto contact with the slip. It is dried at 120° C. for 20 minutes. Frit ingredients for a second layer are listed below in Table 7, and a slip for the second layer consists of the following ingredients listed below in Table 8.

TABLE 7

| Ingredients for frit | Wt. percent |
| --- | --- |
| $B_2O_3$ | 3.1 |
| $Na_2O$ | 6.8 |
| $SiO_2$ | 35.2 |
| $K_2O$ | 5.6 |
| BaO | 1.8 |
| $MnO_2$ | 25.7 |
| CaO | 0.5 |
| $Li_2O$ | 0.8 |
| ZnO | 4.2 |
| $P_2O_5$ | 0.6 |
| $TiO_2$ | 8.6 |
| $Sb_2O_3$ | 7.1 |

The frit is prepared in the same way as in the previous examples.

TABLE 8

| Ingredients for slip | parts by Wt. |
| --- | --- |
| Frit according to Table 7 (softening temperature: 800° C.) | 100 |
| Polytran FS* | 0.5 |
| $NaNO_2$ | 0.5 |
| Water | 45 |

*Polytran FS is a water-soluble bio-polymer composition containing scleroglucan, a high molecular weight polysaccharide produced by fermentation (this is disclosed in U.S. PAT. NO. 3,547,098 to Lee).

The slip according to Table 7 is sprayed onto the dried first layer. The slip layer for the second layer is then dried at 120° C. for 20 minutes. The steel plate with two slip layers is fired at 800° C. for 3 minutes to obtain test specimens. The test specimens are tested in a similar manner as Example 1. They are evaluated in the Peeling Test (Test No. 1), Adherence Test (Test No. 2) and Corrosion Resistance Test (Test No. 3) and it turned out to be satisfactory (classified as "P").

For comparison, some test specimens are provided in accordance with the conventional method, wherein a slip for a first layer is sprayed, dried and then fired at 820° C. for 3 minutes, and thereafter a slip for a second layer is sprayed onto the fired first layer, dried and then fired at 780° C. Such test specimens do not pass the Peeling Test (Test No. 1) and Adherence Test (Test No. 2). They are classified into the group "P" only in the test of Corrosion Resistance Test (Test No. 3).

EXAMPLE 4 (for the second embodiment)

An aluminized steel plate of 50 mm×90 mm and 0.6 mm in thickness with an Al adhesion quantity of 80 g/m² on both faces thereof is employed as a substrate metal. The aluminized steel plate is degreased by a low alkalinity degreasing agent for aluminum. A frit for a slip of a first layer is prepared from the following ingredients listed in Table 9 below. These ingredients are processed in a similar manner as of the preparation of the first frit in Example 1, that means, they are ground in a ball mill in a conventional way to make the frit having a softening temperature of 480° C.

TABLE 9

| Ingredients for frit | Wt. percent |
| --- | --- |
| $SiO_2$ | 50 |
| $B_2O_3$ | 10 |
| $Na_2O$ | 23 |
| $Al_2O_3$ | 5 |
| $Li_2O$ | 8 |
| $K_2O$ | 3 |
| CaO | 7 |

A slip for the first layer is prepared by the following ingredients listed in Table 10 below.

TABLE 10

| No. | Parts by Wt. | | | | Parts by Wt. | |
|---|---|---|---|---|---|---|
| | Frit in Table 9 | $TiO_2$ | $Al_2O_2$ | Kind of binder | quantity of binder | water |
| 1 | 100 | 10 | 10 | Water glass (sodium silicate) | 12 | 45 |
| 2 | 100 | 10 | 10 | Colloidal silica | 5 | 45 |
| 3 | 100 | 10 | 10 | Colloidal alumina | 5 | 45 |
| 4 | 100 | 10 | 10 | Silicone resin | 5 | 45 |
| 5 | 100 | 10 | 10 | CMC | 2 | 45 |
| 6 | 100 | 10 | 10 | PVA | 2 | 45 |
| 7 | 100 | 10 | 10 | Potassium silicate | 12 | 45 |
| 8 | 100 | 10 | 10 | Sodium silicate + Potassium silicate | 6 + 6 | 45 |
| 9 | 100 | 10 | 10 | Colloidal silica + Colloidal alumina | 3 + 3 | 45 |
| 10 | 100 | 10 | 10 | CMC +PVA | 1 + 1 | 45 |

In this example, Snowtex-C (trademark of Nissan Kagaku Co., Japan) is employed for colloidal silica, and Alumina Sol-100 (trademark of the same company) for colloidal alumina, respectively. Shin-etsu Silicone KM 83 of Shin-etsu Kagaku Co., Japan is employed as the silicone resin. The slip in accordance with the ingredients of No. 1-No. 10 in Table 10 is respectively ground and mixed in a ball mill. The slip is then sprayed with a spray gun on the degreased aluminized steel plate. The slip layer is dried at 120° C. for 15 minutes.

For a slip of a second layer, the following ingredients listed in Table 11 below for a color porcelain enamel layer are applied for all types of slips in accordance with the ingredients of No. 1-No. 10 in Table 10.

TABLE 11

| Ingredients | parts by Wt. |
|---|---|
| Frit according to Table 9 | 100 |
| Metal oxide for black coloring | 5 |
| $Al_2O_3$ | 5 |
| Clay | 2 |
| Sodium silicate | 5 |
| Water | 45 |

The slip for the second layer is sprayed onto the dried first slip layer to make a total thickness of about 200 μm including the thickness of the first layer, is dried and then fired at 520° C. for 5 minutes. Test specimens are tested in the following testing items.

(1) Inspection Test (Test No. 4)

The test specimens of 50 mm×90 mm are inspected visually to see whether they have pinholes on the surface thereof or bubbles near the surface thereof. The test result for the inspection test is judged as "P" (pass) when the test specimens do not have pinholes or bubbles. When some pinholes and/or bubbles are observed, the test specimens is evaluated as "F" (fail to pass the inspection test).

(2) Adherence Test (Test No. 5)

The test specimens are wound with their porcelain enamel layers facing out around a column or a shaft of 10 mmϕ until both end parts of the specimen make a bend angle of 180°. The test specimens are observed to determine whether they have flaked portions on the outside face of the bent part. The test result for the adherence test is judged as "P" (pass when both first and second layers remain adhering on the substrate metal) and as "F" (fail to pass) when at least the second layer drops off.

(3) Corrosion Resistance Test (Test No. 6)

The test specimens are exposed to an atomized salt solution of 3% salt concentration at 50° C. for 10 days in a salt spray testing apparatus. The test result for this corrosion resistance test is judged in the same manner as in the test of Corrosion Resistance Test (Test No. 3).

All specimens prepared by the ingredient compositions of No. 1-No. 10 in Table 10 are respectively tested in the Inspection Test (Test No. 4), Adherence Test (Test No. 5) and Corrosion Resistance Test (Test No. 6) to give satisfactory results.

EXAMPLE 5 (for the first embodiment)

A slip for a first layer is prepared in the same manner as in Example 4. The slip is sprayed onto a test specimen and dried at 120° C. for 15 minutes. A slip for a second layer, in this case a self-cleaning coating layer, is prepared by the following ingredients listed in Table 12.

TABLE 12

| Ingredients for slip of self-cleaning coating layer | parts by Wt. |
|---|---|
| Frit in accordance with Example 4 | 100 |
| $\gamma$-$MnO_2$ | 20 |
| $CuCO_3.Cu(OH)_2.nH_2O$ | 10 |
| $Al_2O_3$ | 30 |
| Water glass (sodium silicate) ($SiO_2:Na_2O:H_2O$ = 36:18:46 Wt. %) | 10 |
| Water | 60 |

The slip prepared in accordance with Table 12 is sprayed onto the dried first layer to make a total thickness of about 200 μm, is dried at 80° C. for 15 minutes and then fired at 540° C. for 5 minutes. The test specimen is tested in the testing items in Example 4. Results indicate that the test specimen is satisfactory in the Inspection Test (test No. 4), Adherence Test (Test No. 5) and Corrosion Resistance Test (Test No. 6).

EXAMPLE 6 (for the second embodiment)

Aluminized steel plates are employed for the test specimens in this example. A slip is prepared in accordance with the composition listed in No. 1 of Table 10 (Example 4). The slip is sprayed onto the aluminized steel plates and dried at various temperatures for 15 minutes to form a first layer. A second layer is prepared in accordance with the case in Example 4. A firing for the second layer is made at 520° C. for 5 minutes.

Table 13 below shows test results for the test specimens provided by varying the temperature when the first slip layer is dried.

TABLE 13

| Dry temperature for first layer (°C.) | Test No. 4 Inspection test | Test No. 5 Adherence test | Test No. 6 Corrosion resistance test |
|---|---|---|---|
| 60 | P | P | P |
| 80 | P | P | P |
| 120 | P | P | P |
| 200 | P | P | P |
| 300 | P | P | P |
| 340 | P | P | P |
| 350 | P | P | P |
| 360 | F | F | P |
| 400 | F | F | F |

TABLE 13-continued

| Dry temperature for first layer (°C.) | Test No. 4 Inspection test | Test No. 5 Adherence test | Test No. 6 Corrosion resistance test |
|---|---|---|---|
| 500 | F | F | F |

Note: "P" designates the test specimens which pass the test, whereas "F" designates the ones which fail to pass the test.

As clearly seen from Table 13, the drying temperature for forming the first layer should be no greater than 350° C.

EXAMPLE 7 (for the second embodiment)

An aluminized steel plate which is the same substrate metal employed in Example 4 is processed by low temperature annealing for alloying at 480° C. for 30 minutes to form an (Al, Fe, Si)M layer at the interface between the steel plate and the aluminized layer. A first layer and a second layer are formed by the same compostions used for Example 6 and under the same processing condition (the drying temperature for the first layer employed is 120° C.). Test specimens are tested and it turned out to be satisfactory (grouped in "P") in the Inspection Test (Test No. 4), Adherence Test (Test No. 5) and Corrosion Resistance Test (Test No. 6). Besides, the rear surface which is not covered with the porcelain enamel layers shows no discoloration.

EXAMPLE 8 (for a modified embodiment of the second embodiment)

A slip for a first layer is prepared in accordance with the ingredient composition of Example 4. The slip is sprayed onto test specimens and dried at 120° C. for 15 minutes. A slip for a second layer and a third layer is prepared by the following ingredients listed in Table 14 below.

TABLE 14

| Ingredients for slip | parts by Wt. |
|---|---|
| Frit in accordance with Example 4 | 100 |
| Metal oxide for red coloring | 5 |
| Al$_2$O$_3$ | 5 |
| Sodium silicate | 12 |
| Clay | 2 |
| Water | 47 |

The slip of Table 14 is sprayed onto the first layer and dried at 120° C. for 15 minutes to form the second layer. The slip of Table 14 is again sprayed onto the second layer and dried at 120° C. for 15 minutes. The first, second and third layers are respectively 100 μm in thickness. Then, the test specimens with three layers are fired at 520° C. for 7 minutes. The test specimens are tested and it turned out to be satisfactory (grouped in "P") in the Inspection Test (Test No. 4), Adherence Test (Test No. 5) and Corrosion Test (Test No. 6).

In the conventional manufacturing process to form a self-cleaning catalyst layer on a first porcelain enamel layer, firing of the first porcelain enamel layer is followed the subsequent firing of the self-cleaning catalyst layer. When a mild steel sheet is employed as a substrate metal, there arise several problems as already discussed resulting from the procedure using the second firing step. On the other hand, thin aluminized steel sheet has not been used as a metal substrate for electric ovens, etc., since the aluminized steel sheet with porcelain enamel layers formed by second firing step has had many pinholes and bubbles.

On the contrary, the manufacturing method in accordance with the present invention comprises single firing step for two slip coatings, and therefore a self-cleaning catalyst layer and a porcelain enamel layer can be made free from the conventional adverse drawbacks. One of the distinctive features of the manufacturing method in accordance with the present invention is that the resulting coating layer strongly adheres to the substrate metal to enable easy metal working such as press working and caulking work on the coated substrate metal in successive production steps at a highly reliable level.

When an electric oven is produced employing thin aluminized steel plates, one face of which is coated with a self-cleaning catalyst layer formed by the method of the present invention while leaving the other surface as glossy aluminized face, satisfactory results for the desired self-cleaning effect can be expected, even though the output power of the oven is small (under 1.2 KW). This is partly because the aluminized steel sheet is superior in thermal shielding and therefore heat does not dissipate from the rear face. In addition, since the inner wall of the oven is made of the thin aluminized steel plate, the temperature of the wall face easily rises to a temperature (e.g. about 300° C.) necessary for the self-cleaning catalytic action in a short time.

What we claim is:

1. A method of forming porcelain enamels on a dip aluminized steel sheet comprising the sequential steps of:
   (a) applying a first coating of a first slip adapted to form a first layer, said first slip containing a frit and a binder selected from the group consisting of an alkali silicate, colloidal silica, colloidal alumina, silicone resins, organic binders, and mixtures thereof;
   (b) drying said first coating at a temperature below the softening point of said frit in said first slip at a temperature less than 350° C.;
   (c) applying a second coating of a second slip adapted to form a second layer; and
   (d) firing said first and second coatings in a single firing step after the application of all the slip coatings.

2. The method of claim 1, wherein said second layer contains a slip including at least one frit and a catalyst.

3. The method of claim 1, wherein said aluminized steel sheet has an alloying layer thereon formed by low temperature annealing formed between the steel substrate and the aluminum plating layer thereon.

4. The method of claim 1, wherein said aluminized steel sheet has an additional metal layer formed between the steel substrate and the aluminum plating layer of Al, Fe or Si thereon, said additional metal layer formed by a temperature of about 450° C. to about 500° C.

5. The method of forming porcelain enamels according to claim 1, wherein said softening temperature of said frit of said first slip is no greater than 50° C. above the softening temperature of the frit of said second slip.

6. The method of forming porcelain enamels according to claim 1, wherein said softening temperature of said frit of said first slip is lower than a softening temperature of a frit of said second slip.

7. The method of forming porcelain enamels according to claim 1, wherein, intermediate steps (c) and (d), at least one additional slip coating is formed on said second coating and all of the thus-formed slip coatings are fired in a single firing step after the application of all slip coatings.

8. Method of forming porcelain enamels according to claim 1, wherein the uppermost layer is a glazing layer.

9. A single step firing method of forming a porcelain enamel coating on a dip-aluminized steel sheet substrate comprising, in combination, the successive steps of:
(a) applying an aqueous coating composition of a first slip to form a first layer onto said steel substrate, said aqueous coating composition containing a frit having a softening point greater than 350° C.;
(b) drying the thus applied first coating at a temperature less than 350° C. to remove a substantial portion of the water from said aqueous coating composition and retain said first coating on said steel substrate;
(c) applying a catalyst-containing aqueous coating composition of a second slip containing both a catalyst and a frit which when heated forms a second layer on the dried first layer; and thereafter
(d) heating said first and second coatings on said steel substrate in a single firing step to a temperature in the range of about 520° C. to about 820° C. for a period of time sufficient to soften said first layer thereby forming a pore-free corrosion-resistant layer and a mixture of said first and second layers at their point of contact, the two layers thus formed being strongly bonded together.

10. The method of claim 9, wherein the softening temperature of the frit of said first slip is lower than the softening temperature of the frit of the second slip.

11. The method of claim 9, including the additional step of applying a top glazing layer to the layered, coated substrate prior to heating step (d).

12. The method of claim 9, 10 or 11, wherein the heating step (d) is conducted at a temperature in the range of about 520° C. to about 600° C.

13. The method of claim 12, wherein said aluminized steel sheet has an additional metal layer of Al, Fe or Si, formed intermediate the steel substrate and the aluminum plating thereon.

14. A method of forming a self-cleaning, multilayered, corrosion-resistant porcelain enamel on an aluminized steel sheet using a single firing step, said method consisting essentially of the following successive steps:
(a) applying an aqueous slurry of a first slip adapted to form a ground coat enamel layer on said aluminized steel sheet, said first slip containing a frit and a binder selected from the group consisting of an alkali silicate, colloidal silica, colloidal alumina, a silicone resin, an organic binder, or mixtures thereof, said binder capable of bonding the aluminum surface of said aluminized steel sheet;
(b) drying the thus-applied first coating at a temperature below the softening point of said frit in said first slip at a temperature below 350° C. thereby setting said first slip and adhering same to said aluminized steel sheet;
(c) applying as a second coating a second aqueous slurry of a second slip adapted to form a smooth, self-cleaning layer on said ground coat, said second slip coating containing at least one frit and an oxidizing catalyst, provided that the frit contained in said second slip has a softening point higher than the softening point of the frit contained in said first slip;
(d) drying the thus-applied second slip; and
(e) firing the first and second dried coatings in a single firing step thereby providing an irregular interface and a strong bonding force between the two coatings and a smooth, self-cleaning, corrosion-resistant porcelain enamel layer substantially free from pinholes and bubbles on said steel sheet.

15. The method of claim 14, wherein said oxidizing catalyst is at least one oxide of Mn, Cu, Co, Ni, Cr, Fe, or mixed oxides thereof.

16. The method of claim 14, wherein said oxidizing catalyst is zeolite, Japanese acid clay, activated clay, a silica-alumina compound or a silica-magnesia compound.

17. The method of claim 14, wherein the softening temperature of the frit contained in said second frit is at most 50° C. higher than the softening temperature of the frit contained in said first frit.

18. The method of claim 14, wherein the firing of step (c) is conducted at a temperature about 520° C. to about 600° C.

19. The method of claim 14, wherein the ground coat enamel layer contains color and the self-cleaning layer is clear.

20. The method of claim 14, wherein prior to step (a) said aluminized steel sheet is pretreated at a temperature of about 450° to about 500° C. thereby forming an (Al, Fe, Si)M ternary intermetallic layer at the interface between the steel sheet and the aluminized layer thereon and improving the corrosion resistance of the uncoated near surface of said steel sheet.

21. The method of claim 14, wherein the applied self-cleaning corrosion-resistant porcelain layer has an overall thickness of about 300 microns.

22. The method of claim 14, wherein the layer has an overall thickness of about 200 microns.

* * * * *